United States Patent [19]
Tanaka et al.

[11] Patent Number: 6,122,486
[45] Date of Patent: Sep. 19, 2000

[54] TRANSMISSION RESTRICTING DEVICE RADIO COMMUNICATION TERMINAL EQUIPMENT AND TRANSMISSION RESTRICTING SYSTEM USING THESE

[75] Inventors: Masahiko Tanaka; Kenji Okita, both of Tokyo, Japan

[73] Assignee: NEC Corporation, Tokyo, Japan

[21] Appl. No.: 09/082,556

[22] Filed: May 21, 1998

[30] Foreign Application Priority Data

May 21, 1997 [JP] Japan ................................. 9-130205

[51] Int. Cl.⁷ ....................................................... H04B 1/00
[52] U.S. Cl. ................................. 455/68; 455/456; 455/88
[58] Field of Search ............................... 455/67.7, 68, 565, 455/550, 414, 424, 425, 433, 435, 410, 411, 456, 63, 88; 340/541, 547, 551, 573.1, 506; 342/457

[56] References Cited

U.S. PATENT DOCUMENTS

| | | | |
|---|---|---|---|
| 5,442,805 | 8/1995 | Sagers et al. | 455/422 |
| 5,754,946 | 5/1998 | Cameron et al. | 455/38.1 |
| 5,774,787 | 6/1998 | Leopold et al. | 455/12.1 |
| 5,778,304 | 7/1998 | Grube et al. | 455/422 |
| 5,850,604 | 12/1998 | Dufour et al. | 455/435 |
| 5,914,655 | 6/1999 | Clifton et al. | 340/506 |
| 5,939,986 | 8/1999 | Schiffbauer et al. | 340/573.1 |
| 5,963,137 | 10/1999 | Waters, Sr. | 340/573.4 |
| 5,987,322 | 11/1999 | Gupta et al. | 455/432 |
| 6,011,973 | 1/2000 | Valentine et al. | 455/456 |

FOREIGN PATENT DOCUMENTS

| | | |
|---|---|---|
| 472 349 A2 | 2/1992 | European Pat. Off. . |
| 4-111625 | 4/1992 | Japan . |
| 4-216221 | 8/1992 | Japan . |
| 4-369935 | 12/1992 | Japan . |
| 7-87568 | 3/1995 | Japan . |
| 7-264671 | 10/1995 | Japan . |
| WO 98/25433 | 6/1998 | WIPO . |

OTHER PUBLICATIONS

Karl Weiss, et al., "Conventional Local Area Radio Coverage System", Motorola, Inc., *Technical Developments*, vol. 13, dated Jul. 1, 1991, pp. 67–69.

*Primary Examiner*—Dwayne D. Bost
*Assistant Examiner*—Joy K. Redmon
*Attorney, Agent, or Firm*—Scully, Scott, Murphy & Presser

[57] ABSTRACT

Disclosed is a transmission restricting system which has a transmission interruption controlling means for generating and radiating a magnetic field pattern including a command code to command the transmission interruption to a radio communication terminal equipment in a radio-wave transmission-prohibited area, the transmission interruption controlling means being disposed at the entrance or exit of the radio-wave transmission-prohibited area; a transmission interruption releasing means for generating and radiating a magnetic field pattern including a command code to command the releasing of transmission interruption to the radio communication terminal equipment in the radio-wave transmission-prohibited area, the transmission interruption releasing means being disposed at the entrance or exit of the radio-wave transmission-prohibited area; and a radio communication terminal equipment comprising means for detecting a magnetic field pattern including a command code to command the transmission interruption or the releasing of transmission interruption, and means for controlling the process of the transmission interruption or the releasing of transmission interruption according to the result of the detection of the detecting means.

12 Claims, 8 Drawing Sheets

TRANSMISSION RESTRICTING DEVICE RADIO COMMUNICATION TERMINAL EQUIPMENT AND TRANSMISSION RESTRICTING SYSTEM USING THESE

FIELD OF THE INVENTION

This invention relates to a transmission restricting device, a radio communication terminal equipment and a transmission restricting system using these that are used to restrict the transmission function or the like of a radio communication terminal equipment, such as a portable telephone, in an area where a radio-wave signal transmission is prohibited.

BACKGROUND OF THE INVENTION

Conventional radio-wave signal transmission restricting systems are operated by transmitting a transmission restricting command from a transmission restricting device through radio waves to a radio communication terminal equipment that exists in a transmission-prohibited area, thereby forcing the radio communication terminal equipment receiving the transmission restricting command to shift to the transmission stopping mode and to turn off the power source.

However, in the conventional radio-wave signal transmission restricting systems, there is a problem that instruments in a hospital or airplane, such as an artificial-heart pace maker, may have a high possibility of being affected by the radio waves transmitted when the transmission restriction is conducted. This is because they use radio waves to conduct the transmission restriction.

Also, it is required that the user operates to turn off the power source of the radio communication terminal equipment by himself to release the transmission restriction.

Furthermore, the transmission restriction does not effect when the radio communication terminal equipment with the power source turned off is entered into the transmission-prohibited area where the transmission restricting device is disposed only at the entrance. Therefore, the transmission can be conducted when the user turns on the power source inside the transmission-prohibited area. To prevent this, the restricting device needs to be disposed not only throughout the entrance but also at the entire transmission-prohibited area.

It is not practical.

SUMMARY OF THE INVENTION

Accordingly, it is an object of the invention to provide a transmission restricting device and a transmission restricting system that the restriction of transmission or its release can be automatically conducted without affecting instruments peripherally located.

It is a further object of the invention to provide a radio communication terminal equipment that can be subject to the transmission restriction in a transmission-prohibited area even when the power source of the radio communication terminal equipment is turned off.

According to the invention, a transmission restricting device, comprises:

a transmission interruption controlling means for generating and radiating a magnetic field pattern including a command code to command the transmission interruption to a radio communication terminal equipment in a radio-wave transmission-prohibited area; and a transmission interruption releasing means for generating and radiating a magnetic field pattern including a command code to command the releasing of transmission interruption to the radio communication terminal equipment in the radio-wave transmission-prohibited area.

According to another aspect of the invention, a radio communication terminal equipment, comprises:

means for detecting a magnetic field pattern including a command code to command the transmission interruption or the releasing of transmission interruption; and means for controlling the process of the transmission interruption or the releasing of transmission interruption according to the result of the detection of the detecting means.

According to another aspect of the invention, a transmission restricting system, comprises:

a transmission interruption controlling means for generating and radiating a magnetic field pattern including a command code to command the transmission interruption to a radio communication terminal equipment in a radio-wave transmission-prohibited area, the transmission interruption controlling means being disposed at the entrance or exit of the radio-wave transmission-prohibited area; and a transmission interruption releasing means for generating and radiating a magnetic field pattern including a command code to command the releasing of transmission interruption to the radio communication terminal equipment in the radio-wave-transmission-prohibited area, the transmission interruption releasing means being disposed at the entrance or exit of the radio-wave transmission-prohibited area; and a radio communication terminal equipment comprising means for detecting a magnetic field pattern including a command code to command the transmission interruption or the releasing of transmission interruption, and means for controlling the process of the transmission interruption or the releasing of transmission interruption according to the result of the detection of the detecting means.

In this invention, the transmission restriction to the radio communication terminal equipment is conducted by using a magnetic field transmitter (generator) and a magnetic field receiver that do not affect instruments peripherally located. Therefore, the transmission restriction can be performed without causing a malfunction in the instruments. Also, the function of the radio communication terminal equipment can be forcedly restricted without affecting instruments peripherally located in a radio-wave transmission-prohibited area. Further, the functions of the radio communication terminal equipment that are subject to the restriction can be optionally selected. Namely, the range of functions to be subject to the restriction can be optionally changed.

Also, the transmission restriction or its release can be commanded to the radio communication terminal equipment even when the power source of the radio communication terminal equipment is turned off. Therefore, this system can function by placing the transmission interruption controller and transmission interruption releaser only at the entrance or exit of the radio-wave transmission-prohibited area. Namely, it is not required to place the transmission interruption controller and transmission interruption releaser inside the radio-wave transmission-prohibited area.

Furthermore, the transmission restriction or its release can be conducted even around a place that instruments are used because this system uses the magnetic field variation that do not affect the instruments.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
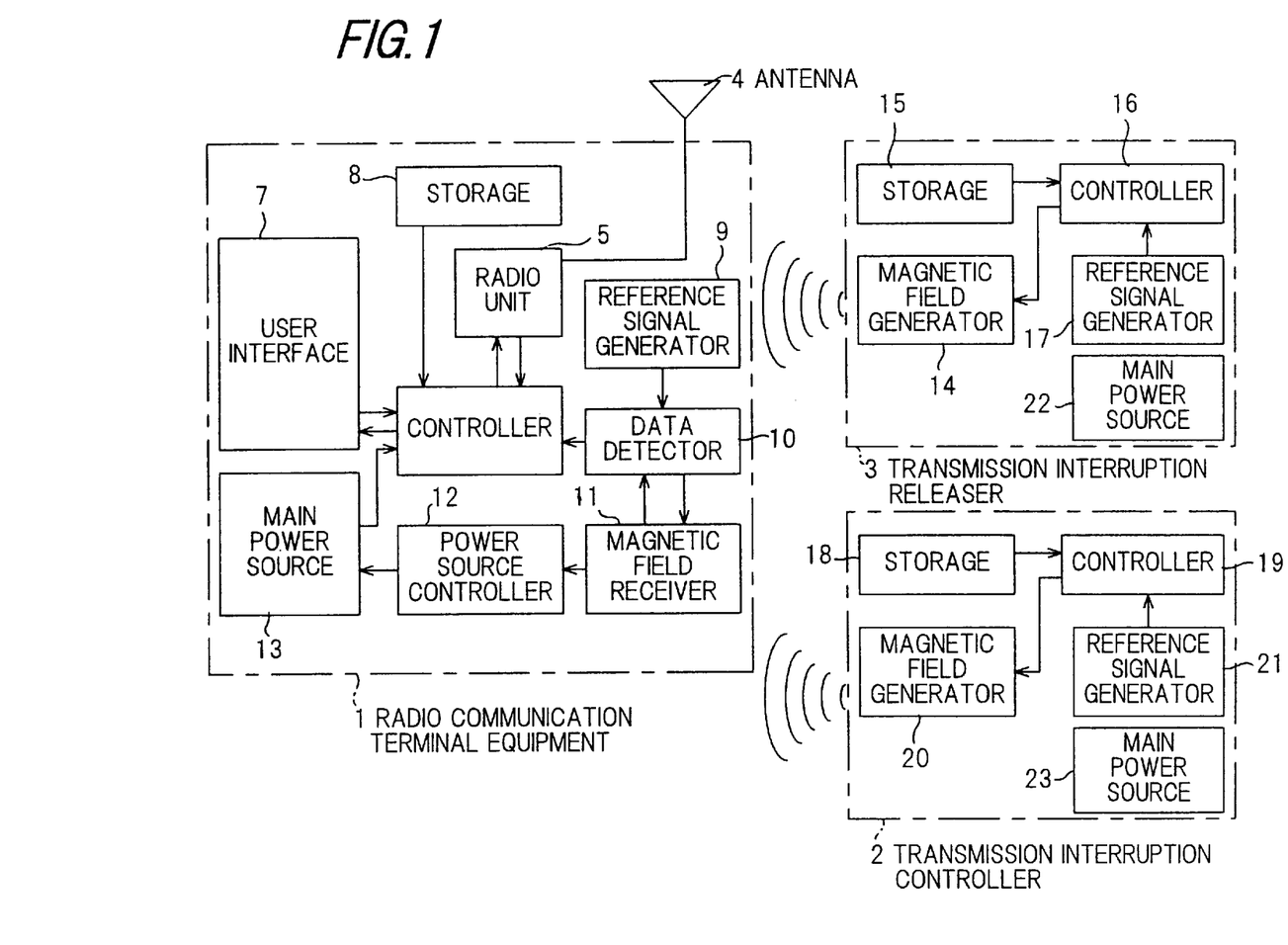
FIG. 1 is a block diagram showing a transmission restricting system in a first preferred embodiment according to the invention.

A transmission restricting system in the first preferred embodiment will be explained in FIG. 1. The transmission restricting system in the first embodiment, which is used mainly for a building such as a hospital and an airplane etc., comprises a radio communication terminal equipment 1, a transmission interruption controller 2, and a transmission interruption releaser 3.

The radio communication terminal equipment 1 comprises an antenna 4 used to conduct an ordinary radio communication, a radio unit 5, a controller 6 to control the whole equipment, a user interface 7 used to receive the user's request or to display information, a storage 8 to store internal information about the radio communication terminal equipment 1, a reference signal generator 9 used to facilitate the data communication with the transmission interruption controller 2 or transmission interruption releaser 3, a magnetic field receiver 11 to detect a variation in magnetic field to be transmitted from the transmission interruption controller 2 or transmission interruption releaser 3, a data detector 10 to reproduce data from the magnetic field variation received by the magnetic field receiver 11, a power source controller 12 to monitor and control a power source for the whole radio communication terminal equipment 1, and a main power source 13 for the radio communication terminal equipment 1.

Figure 2A:
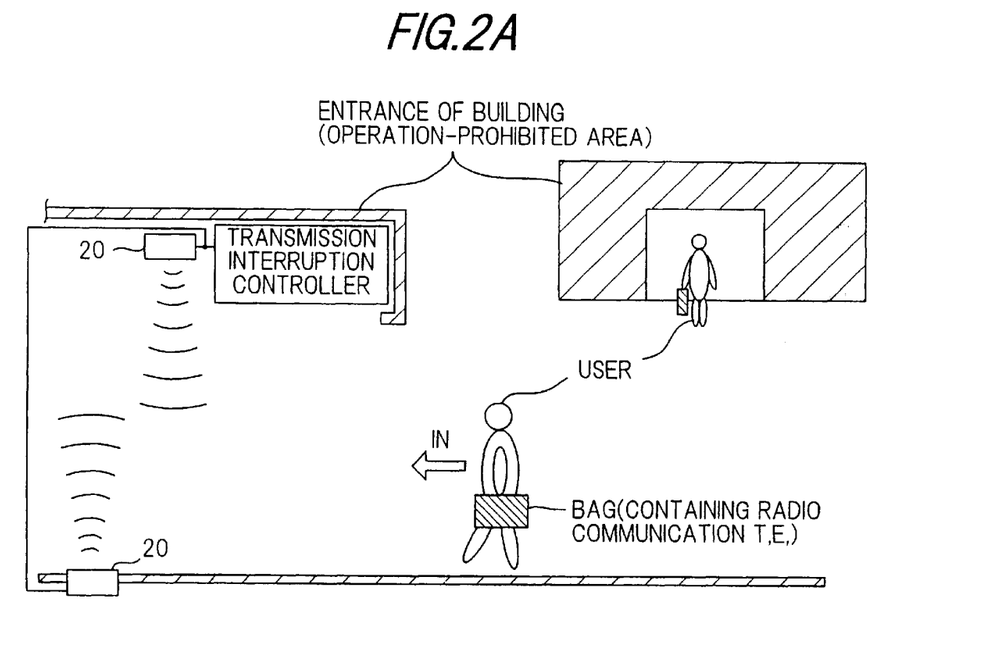
FIGS. 2A and 2B are illustrations showing an example of placement of the system in FIG. 1.

The transmission interruption controller 2 is, as shown in FIG. 2A, disposed at the entrance (substantially entrance and exit) of the radio-wave signal transmission-prohibited area in the building. The transmission interruption controller 2 comprises a magnetic field generator 20 to transmit the magnetic field variation to the magnetic field receiver 11 of the radio communication terminal equipment 1, a controller 19 to control the whole transmission interruption controller 2 as well as controlling the temporal interval and variation pattern of the magnetic field generated, a storage 18 to store in advance the magnetic field variation information to be generated from the magnetic field generator, and a reference signal generator 21 to facilitate the data communication with the radio communication terminal equipment 1.

Figure 2B:
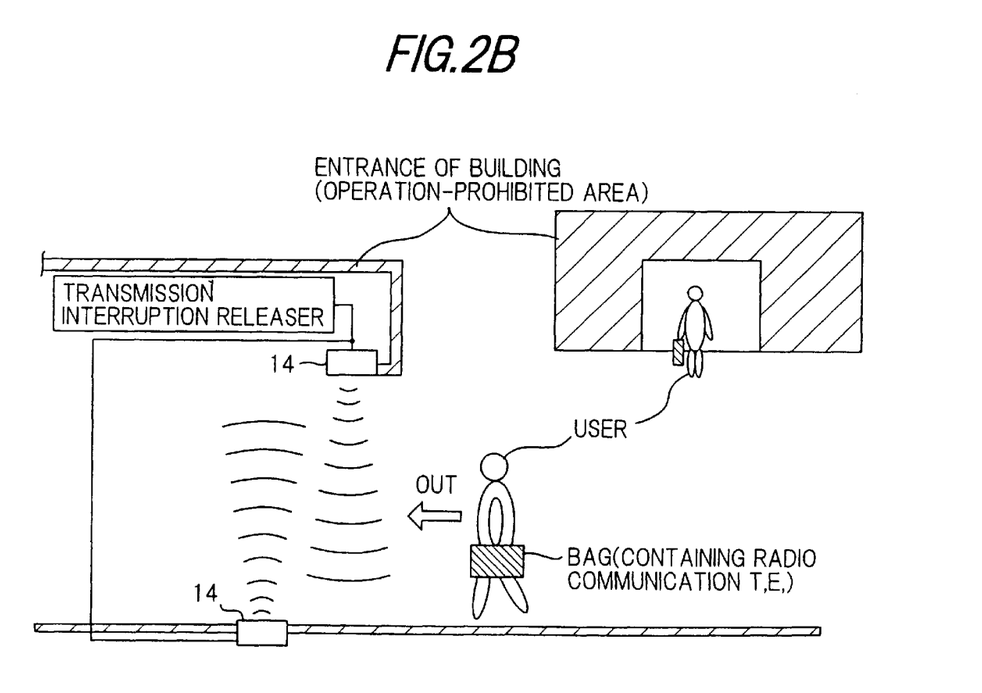

The transmission interruption releaser 3 is, as shown in FIG. 2B, disposed at the entrance (substantially entrance and exit) of the radio-wave signal transmission-prohibited area in the building. The transmission interruption releaser 3 has the same composition as the transmission interruption controller 2 except that a storage 15 thereof stores different contents. Meanwhile, a magnetic field generator 14 thereof is, as shown in FIG. 2B, disposed at a position closer to the entrance than the magnetic field generator 20 of the transmission interruption controller 2. This is because the transmission restriction is not conducted yet when the user comes into the transmission-prohibited area and, on the contrary, the transmission restriction is already conducted when the user goes out the transmission-prohibited area.

Next, the operation of the transmission restricting system in the first embodiment will be explained in FIGS. 1 to 4. When the main power source is attached to the radio communication terminal equipment 1 (S1), the radio communication terminal equipment 1 enters into the state of waiting the magnetic field reception even when the power source is turned off (S2). When the user comes in the radio-wave signal transmission-prohibited area while carrying the radio communication terminal equipment 1, the magnetic field receiver 11 detects magnetic field (S19) to be generated from the transmission interruption controller 2 disposed at the entrance (S2)

Figure 3:
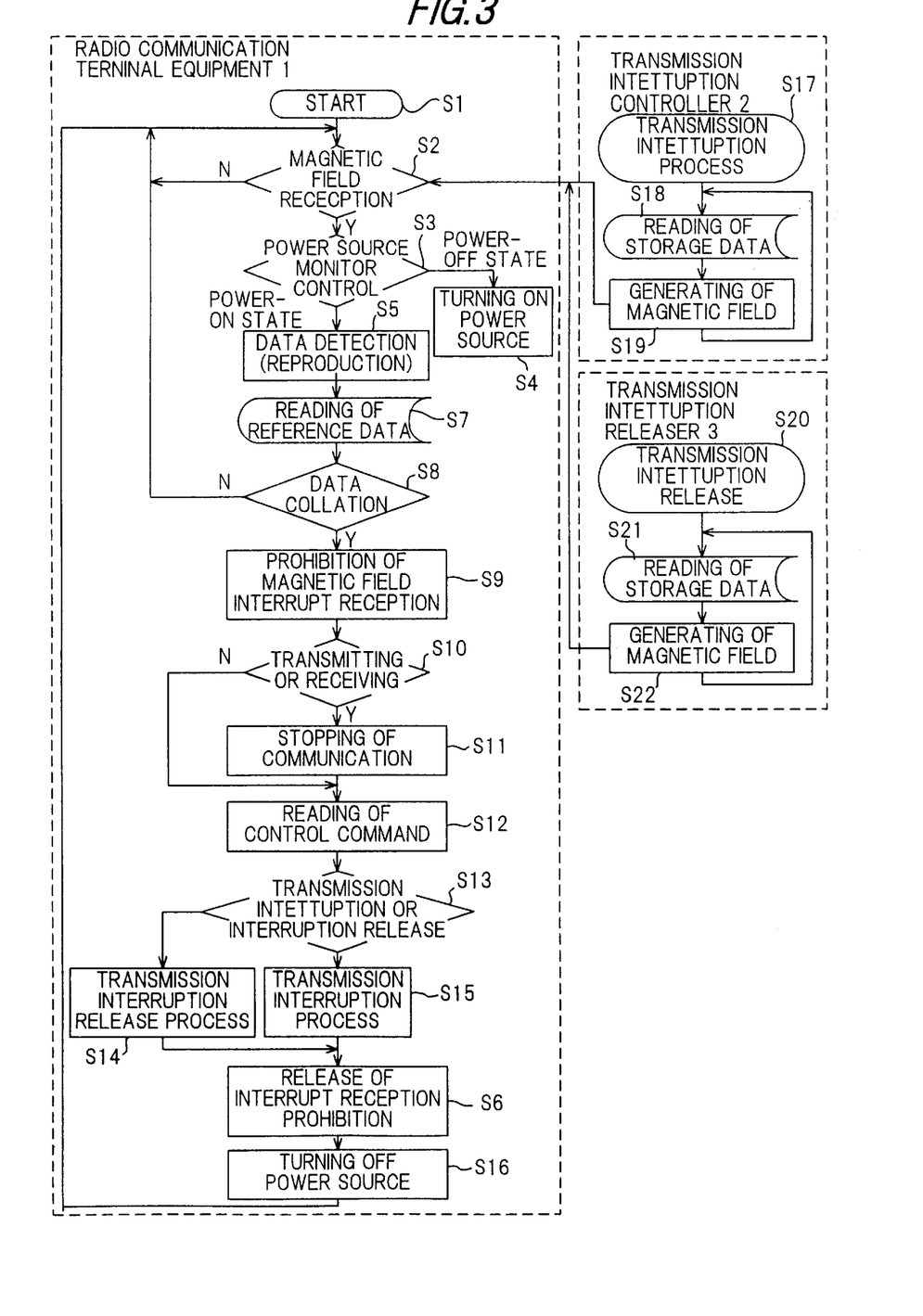
FIG. 3 is a flow chart showing an example of operation of the system in FIG. 1.

After the magnetic field receiver 11 detects the magnetic field variation, the controller 12 of the radio communication terminal equipment 1 is powered to conduct the power source monitor control (S3). The power source state is checked by the power source controller 12 (S3), and the power source is turned on when the radio communication terminal equipment 1 is turned off (S4).

Figure 4:
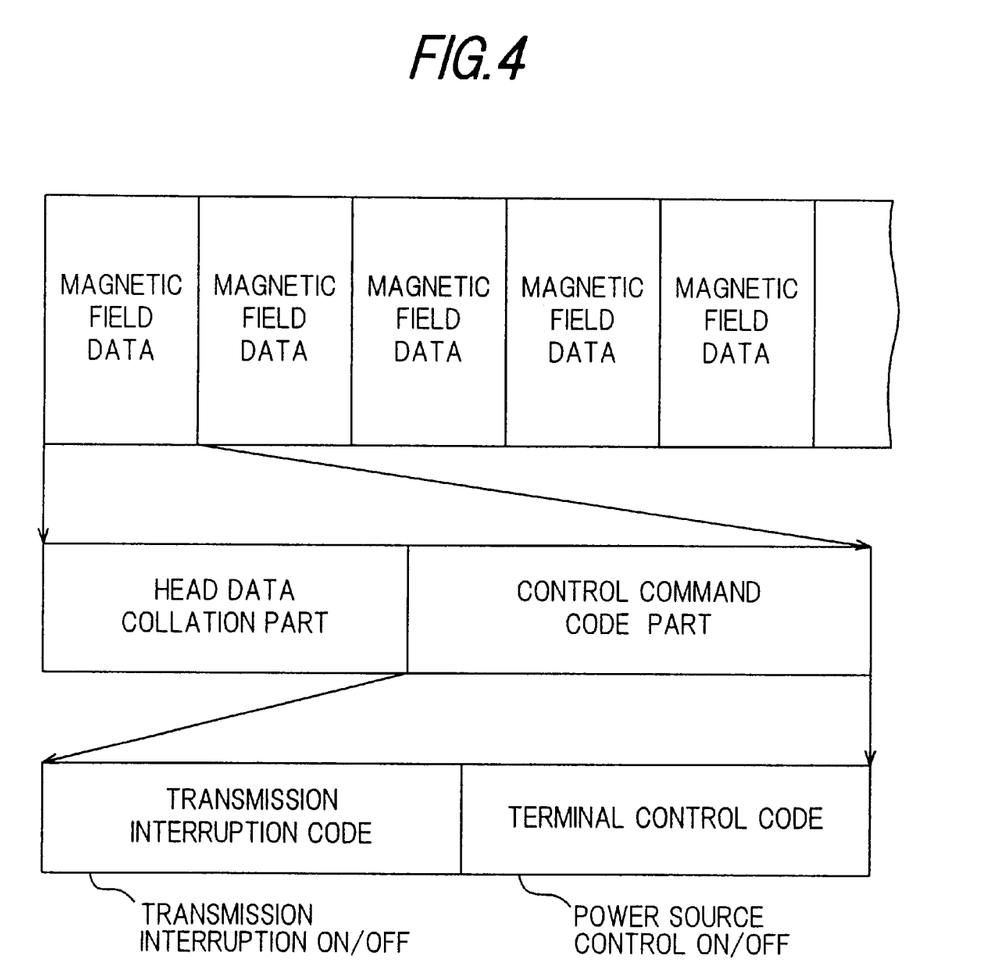
FIG. 4 is a diagram showing an example of magnetic field data sequence used in the system in FIG. 1.

After the power source is turned on, the data detector 10 converts the magnetic field variation detected by the magnetic field receiver 11 into a data sequence while synchronizing with a timing to be generated from the reference signal generator 9 (S5). After the data detector 10 reproduces the data sequence, the controller 6 reads a reference data (FIG.4) stored in advance in the storage 8 (S7), collating it with the received and reproduced data (S8), detecting head data collation part (FIG. 4). When the two data do not coincide as the result of the collation, the magnetic field reception is conducted again (S2). When they coincide as the result of the collation, the magnetic field interrupt reception to the magnetic field receiver 11 is prohibited (S9).

Then, it is confirmed that the radio communication terminal equipment 1 is not in the transmitting or receiving state (S10). When the radio communication terminal equipment 1 is in the transmitting or receiving state, the communication is stopped immediately (S11) Then, the control command code part (FIG. 4) of the data sequence reproduced at Step S5 is extracted (S12), then conducting a transmission interruption process (S15) or a transmission interruption release process (S14) according to the command of the controller 6.

The operation in the transmission interruption process (S15) based upon the control command code part (FIG. 4) is determined by the contents stored in the storage 18 of the transmission interruption controller 2, e.g., the prohibition of transmitting or receiving operation, the prohibition of user's operation to the terminal equipment 1 after turning on the power source etc.

After conducting the transmission interruption process (S15) or transmission interruption release process (S14), the radio communication terminal equipment 1 releases the magnetic field receiver 11 from the magnetic field interrupt reception prohibition by the controller 6 (S6), then turning off the power source to end the process (S16).

The transmission interruption controller 2 reads the magnetic field variation information stored in advance in the storage 18 to be transmitted to the radio communication terminal equipment 1 according to the controller 19 (S18), then generating magnetic field from the magnetic field generator 20 while synchronizing with the timing generated by the reference signal generator 21 (S19), further repeating these operations.

In like manner, the transmission interruption releaser 3 reads the magnetic field variation information stored in advance in the storage 15 to be transmitted to the radio communication terminal equipment 1 according to the controller 16 (S21), then generating magnetic field from the magnetic field generator 14 while synchronizing with the timing generated by the reference signal generator 17 (S22), further repeating these operations.

Figure 5:
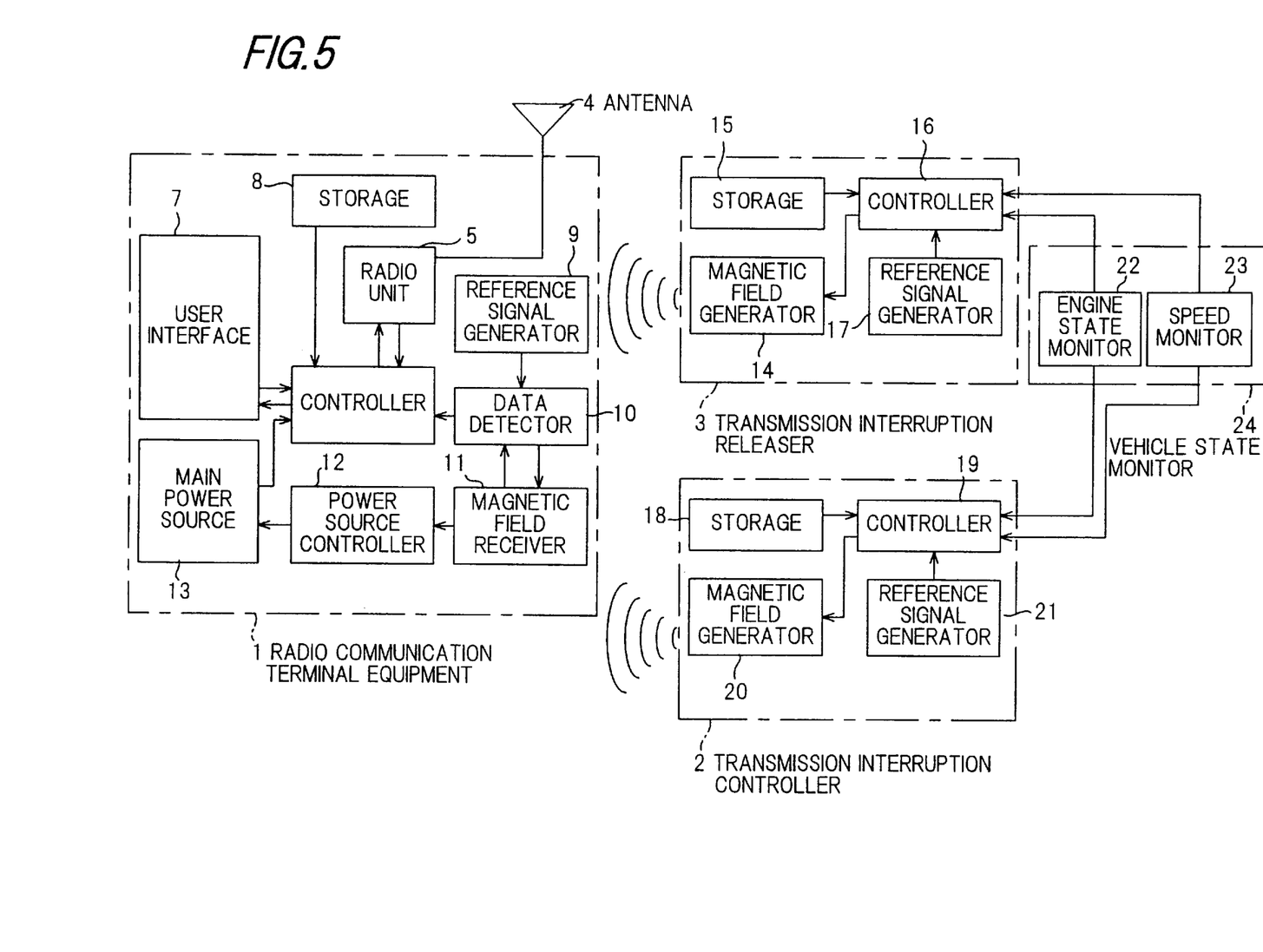
FIG. 5 is a block diagram showing a transmission restricting system in a second preferred embodiment according to the invention.

Next, a transmission restricting system in the second preferred embodiment will be explained in FIG. 5, wherein like parts are indicated by like reference numerals as used in FIG. 1.

The transmission restricting system in the second embodiment, which is used mainly for traffic facilities, such as an automobile and a motor truck etc., comprises a radio communication terminal equipment 1, a transmission interruption controller 2, a transmission interruption releaser 3, and a vehicle state monitor 24.

The radio communication terminal equipment 1 comprises an antenna 4 used to conduct an ordinary radio communication, a radio unit 5, a controller 6 to control the whole equipment, a user interface 7 used to receive the user's request or to display information, a storage 8 to store internal information about the radio communication terminal equipment 1, a reference signal generator 9 used to facilitate the data communication with the transmission interruption controller 2 or transmission interruption releaser 3, a magnetic field receiver 11 to detect a variation in magnetic field to be transmitted from the transmission interruption controller 2 or transmission interruption releaser 3, a data detector 10 to reproduce data from the magnetic field variation received by the magnetic field receiver 11, a power source controller 12 to monitor and control a power source for the whole radio communication terminal equipment 1, and a main power source 13 for the radio communication terminal equipment 1.

Figure 6A:
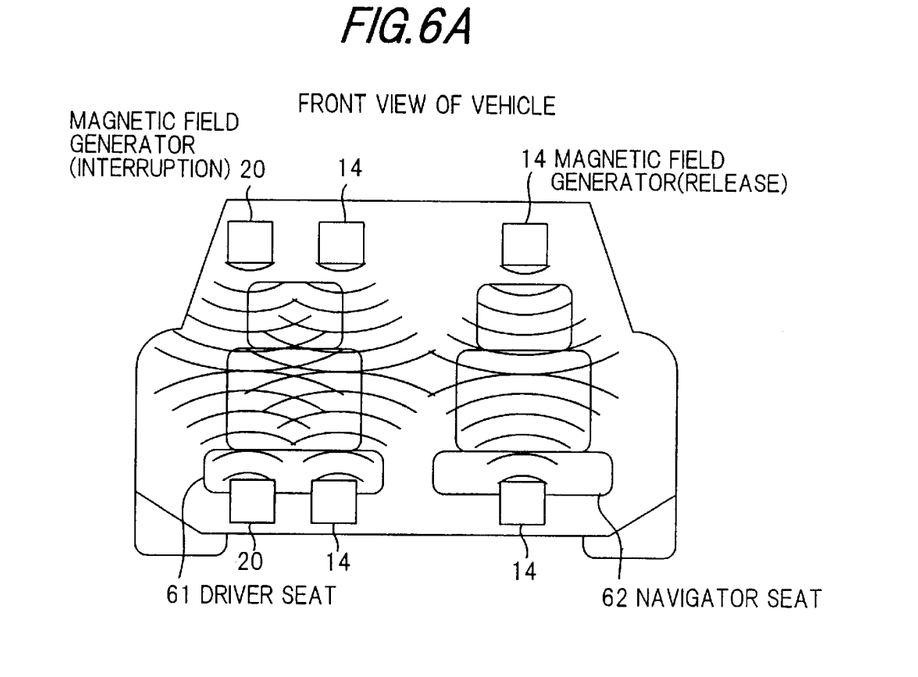
FIGS. 6A and 6B are illustrations showing an example of placement of the system in FIG. 5.
Figure 6B:
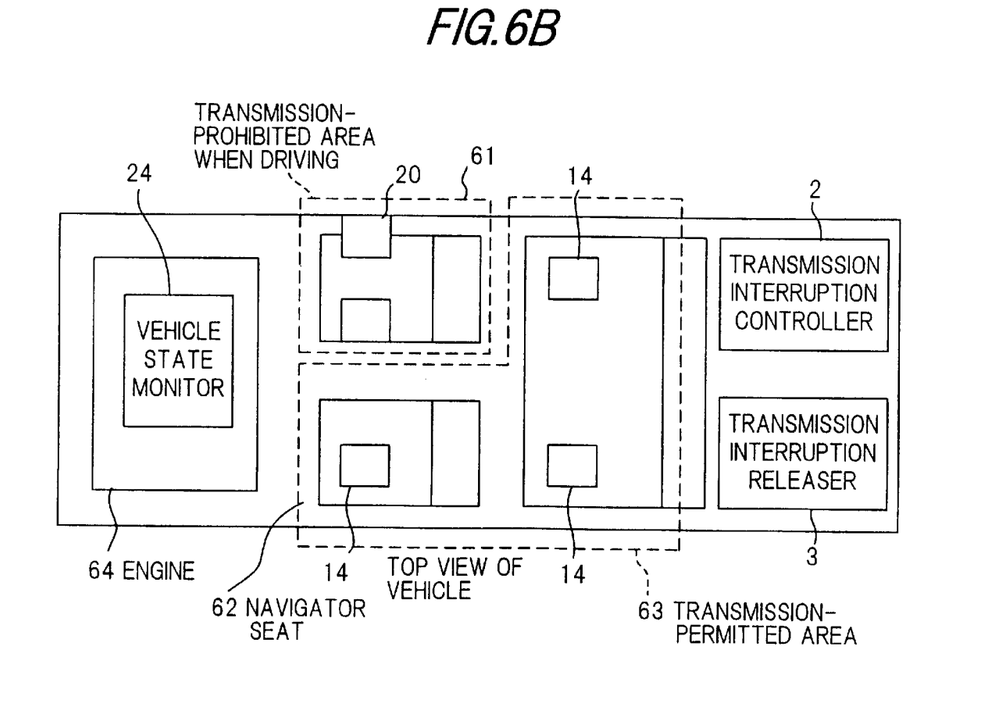
Figure 7:
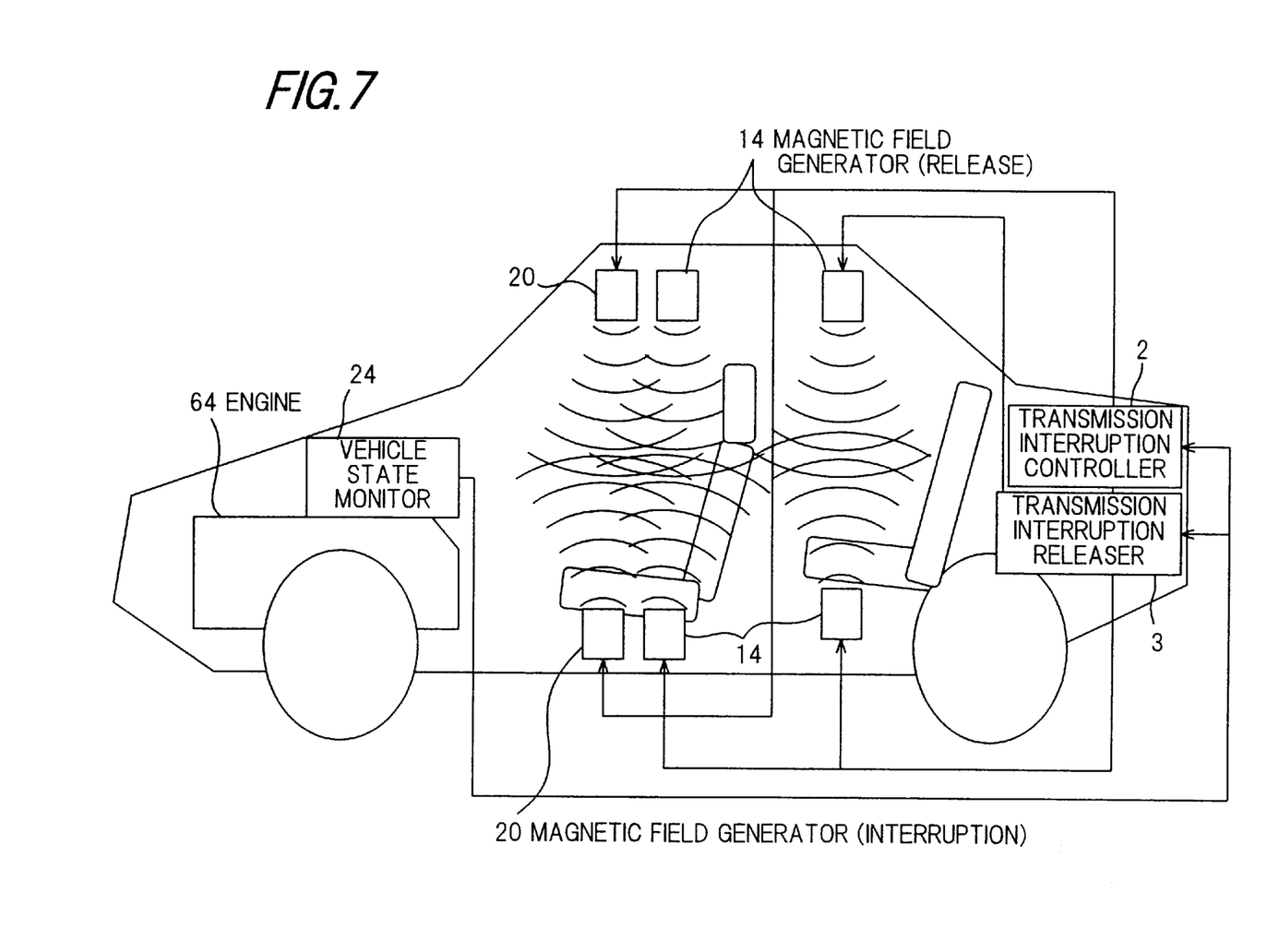
FIG. 7 is an illustration showing an example of placement of the system in FIG. 5.

The transmission interruption controller 2 is, as shown in FIGS. 6A to 7, disposed on a driver seat side 61 to be located as the radio-wave signal transmission-prohibited area when driving the vehicle, such as an automobile. The transmission interruption controller 2 comprises a magnetic field generator 20 to transmit the magnetic field variation to the magnetic field receiver 11 of the radio communication terminal equipment 1, a controller 19 to control the whole transmission interruption controller 2 as well as controlling the temporal interval and variation pattern of the magnetic field generated, a storage 18 to store in advance the magnetic field variation information to be generated from the magnetic field generator, and a reference signal generator 21 to facilitate the data communication with the radio communication terminal equipment 1.

The transmission interruption releaser 3 has the same composition as the transmission interruption controller 2. A magnetic field generator 14 thereof is, as shown in FIGS. 6A to 7, disposed on the driver seat side 61 to be located as the radio-wave signal transmission-prohibited area when driving the vehicle, such as an automobile, and on a navigator seat side 62 and a rear seat side 63 to be located normally as the transmission-permitted area. Also, the magnetic field to be generated from the transmission interruption controller 2 and transmission interruption releaser 3 is controlled by the vehicle state monitor 24.

The vehicle state monitor 24, which is disposed at around the engine 64 of the vehicle, comprises an engine state monitor 22 mainly to monitor the state of the engine, and a vehicle speed monitor 23 to monitor whether the vehicle is driven or stopped.

Figure 8:
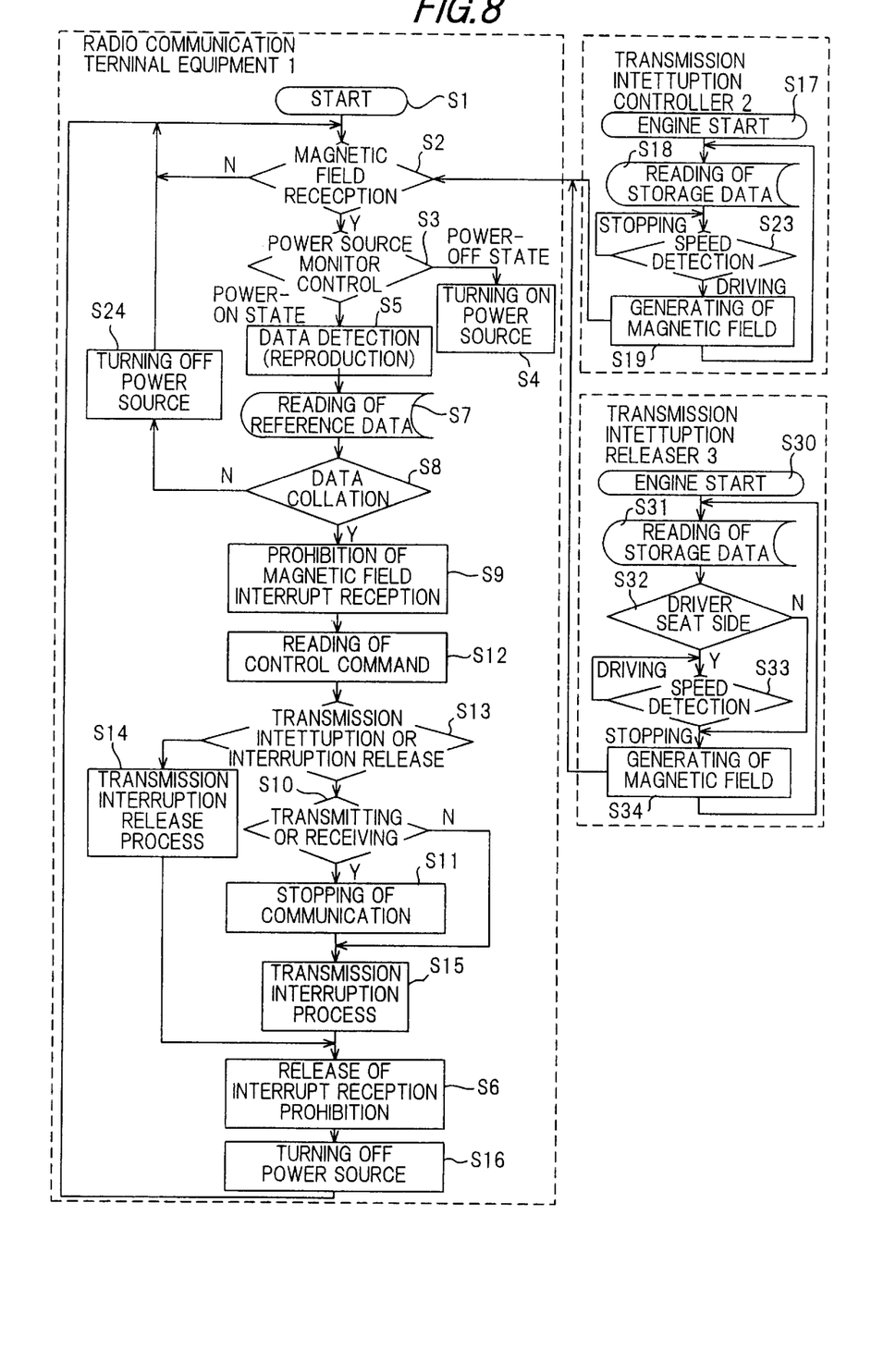
FIG. 8 is a flow chart showing an example of operation of the system in FIG. 5.

Next, the operation of the transmission restricting system in the second embodiment will be explained in FIG. 8, wherein like steps are indicated by like reference numerals as used in FIG. 3. In the second embodiment, it is mainly intended to conduct the prohibition of radio-wave signal transmission on the driver seat side when driving the vehicle.

When the engine of the vehicle with the vehicle state monitor 24 is actuated, the engine state monitor 23 detects the actuation of the engine, then powering to the transmission interruption controller 2 and transmission interruption releaser 3. Meanwhile, the powering to the transmission interruption controller 2 and transmission interruption releaser 3 is stopped at the time when the engine is stopped.

After powering to the transmission interruption controller 2 (S17), the controller 19 reads the data stored in the storage 18 (S18), waiting the interrupt of the vehicle speed monitor 23 of the vehicle state monitor 24. The vehicle speed monitor 23 does not conduct the interrupt to the controller 19 until when it detects a substantial vehicle speed, and the magnetic field is therefore not generated. When the vehicle start driving and the vehicle speed monitor 23 detects a substantial vehicle speed (S23), the interrupt to the controller 19 occurs, thereby generating the magnetic field (S19).

Basically, the transmission interruption releaser 3 conducts the same operation as the transmission interruption controller 2 (S31 to S34). However, only the magnetic field generators 14 on the driver seat side of the transmission interruption releaser 3 generate the magnetic field according to the speed detection (S33), and the other magnetic field generators 14 on the navigator seat side and rear seat side, which are in the lump indicated as 'transmission-permitted area 63' in FIG. 6B, of the transmission interruption releaser 3 continue to generate the magnetic field from the start through the end of the vehicle driving.

When the main power source is attached to the radio is communication terminal equipment 1 (S1), the radio communication terminal equipment 1 enters into the state of waiting the magnetic field reception even when the power source is turned off (S2). When the user with the radio communication terminal equipment 1 sits on the driver seat as the radio-wave signal transmission-prohibited area and he actuates the vehicle engine and starts diving, the magnetic field receiver 11 detects magnetic field to be generated from the magnetic field generators 20 of transmission interruption controller 2 disposed at upper and lower positions of the vehicle.

After the magnetic field receiver 11 detects the magnetic field variation (S2), the controller 12 of the radio communication terminal equipment 1 is powered to conduct the power source monitor control and the power source state is checked up by the power source controller 12 (S3), and the power source is turned on when the radio communication terminal equipment 1 is turned off (S4).

When the power source is turned on, the data detector 10 converts the magnetic field variation detected by the magnetic field receiver 11 into a data sequence while synchronizing with a timing to be generated from the reference signal generator 9 (S5).

After the data detector 10 reproduces the data sequence, the controller 6 reads a reference data (FIG. 4) stored in advance in the storage 8 (S7), collating it with the received and reproduced data (S5), detecting head data collation part (FIG. 4). When the two data do not coincide as the result of the collation, the magnetic field reception is conducted again (S2) after turning off the power source (S24). When they coincide as the result of the collation, the magnetic field interrupt reception to the magnetic field receiver 11 is prohibited (S9).

Then, at step S12, the control command code part (FIG. 4) of the data sequence reproduced at Step S5 is extracted (S12), then conducting a transmission interruption process (S15) or a transmission interruption release process (S14) according to the command of the controller 6. In this case, it is confirmed that the radio communication terminal equipment 1 is not in the transmitting or receiving state (S10). When the radio communication terminal equipment 1 is in the transmitting or receiving state, the communication is stopped immediately (S11).

The operation in the transmission interruption process (S15) based upon the control command code part (FIG. 4) is determined by the contents stored in the storage 18 of the transmission interruption controller 2, e.g., the prohibition of transmitting or receiving operation, the prohibition of user's operation to the terminal equipment 1 after turning on the power source etc.

After conducting the transmission interruption process (S15) or transmission interruption release process (S14), the radio communication terminal equipment 1 releases the magnetic field receiver 11 from the magnetic field interrupt reception prohibition by the controller 6 (S6), then turning off the power source to end the process (S16).

The transmission interruption controller 2 reads the magnetic field variation information stored in advance in the storage 18 to be transmitted to the radio communication terminal equipment 1 according to the controller 19 (S18), then generating magnetic field from the magnetic field generators 20 while synchronizing with the timing generated by the reference signal generator 21 (S19). In this case, the vehicle speed detection (S23) is conducted. Therefore, the magnetic field is not generated when the vehicle is stopping.

In like manner, the transmission interruption releaser 3 reads the magnetic field variation information stored in advance in the storage 15 to be transmitted to the radio communication terminal equipment 1 according to the controller 16 (S31), then generating magnetic field from the magnetic field generators 14 while synchronizing with the timing generated by the reference signal generator 17 (S34). Only the magnetic field generators 14 on the driver seat side of the transmission interruption releaser 3 generate the magnetic field according to the speed detection (S33). The magnetic field is not generated when the vehicle is driven.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A transmission restricting device, comprising:
    a transmission interruption controlling means for generating and radiating a magnetic field pattern including a command code to command the transmission interruption to a radio communication terminal equipment which normally can transmit radio-wave transmissions to prevent the transmission of radio-wave transmissions in a radio-wave transmission-prohibited area; and
    a transmission interruption releasing means for generating and radiating a magnetic field pattern including a command code to command the releasing of transmission interruption to said radio communication terminal equipment to allow the transmission of radio-wave transmissions by the radio communication terminal equipment.

2. A transmission restricting device, according to claim 1, wherein:
    said magnetic field pattern is generated according to a predetermined pattern to be stored in advance.

3. A radio communication terminal equipment, comprising:
    means for detecting a magnetic field pattern including a command code to command the transmission interruption, to prevent the transmission of radio-wave transmissions by the radio communication terminal equipment, or the releasing of transmission interruption to allow the transmission of radio-wave transmissions by the radio communication equipment and
    means for controlling the radio communication terminal equipment in the transmission interruption to prevent the transmission of radio-wave transmissions or the releasing of transmission interruption to allow the transmission of radio-wave transmissions according to the result of the detection of said detecting means.

4. A radio communication terminal equipment, according to claim 3, wherein:
    said detecting means outputs the detection of the magnetic field pattern when said magnetic field pattern corresponds to a predetermined magnetic field pattern.

5. A radio communication terminal equipment, according to claim 3, wherein:
    said detecting means is allowed to detect said magnetic field pattern even when the power source of said radio communication terminal equipment is turned off.

6. A radio communication terminal equipment, according to claim 4, wherein:
    said detecting means is allowed to detect said magnetic field pattern even when the power source of said radio communication terminal equipment is turned off.

7. A transmission restricting system, comprising:
    a transmission interruption controlling means for generating and radiating a magnetic field pattern including a command code to command the transmission interruption to a radio communication terminal equipment which normally can transmit radio-wave transmissions to prevent the transmission of radio-wave transmissions in a radio-wave transmission-prohibited area, said transmission interruption controlling means being disposed at the entrance or exit of said radio-wave transmission-prohibited area; and
    a transmission interruption releasing means for generating and radiating a magnetic field pattern including a command code to command the releasing of transmission interruption to said radio communication terminal equipment to allow the transmission of radio-wave transmissions by the radio communication terminal equipment, said transmission interruption releasing means being disposed at the entrance or exit of said radio-wave transmission-prohibited area; and
    a radio communication terminal equipment comprising means for detecting a magnetic field pattern including a command code to command the transmission interruption, to prevent the transmission of radio-wave transmissions by the radio communication terminal equipment, or the releasing of transmission interruption to allow the transmission of radio-wave transmissions by the radio communication terminal equipment and means for controlling the radio communication terminal equipment in the transmission interruption to prevent the transmission of radio-wave transmissions or the releasing of transmission interruption to allow the transmission of radio-wave transmissions according to the result of the detection of said detecting means.

8. A transmission restricting system, according to claim 7, wherein:

said radio-wave transmission-prohibited area is the inside of a hospital or a vehicle.

9. A transmission restricting system, according to claim 7, wherein:

said transmission interruption releasing means has part to radiate the magnetic field pattern closer to said entrance or exit than that of said transmission interruption controlling means.

10. A transmission restricting system, according to claim 8, wherein:

said transmission interruption releasing means has part to radiate the magnetic field pattern closer to said entrance or exit than that of said transmission interruption controlling means.

11. A transmission restricting system, according to claim 7, further comprising means for monitoring the state of vehicle engine, wherein:

said radio-wave transmission-prohibited area is the inside of a vehicle, and said transmission interruption controlling means and said transmission interruption releasing means operates according to the result of the monitoring.

12. A transmission restricting system, according to claim 11, further comprising means for detecting the speed of said vehicle, wherein:

said transmission interruption controlling means and said transmission interruption releasing means operates according to the result of the detection of the vehicle speed.

* * * * *

UNITED STATES PATENT AND TRADEMARK OFFICE
CERTIFICATE OF CORRECTION

PATENT NO.   : 6,122,486
DATED        : September 19, 2000
INVENTOR(S)  : M. Tanaka, et al.

It is certified that error appears in the above-identified patent and that said Letters Patent is hereby corrected as shown below:

Column 6,
Line 46: "radio is communication" should read -- radio communication --

Column 7,
Line 6: "(S5)" should read -- (58) --

Column 8,
Line 14, "pattern to be stored" should read -- pattern stored --

Signed and Sealed this

Thirty-first Day of July, 2001

*Attest:*

*Nicholas P. Godici*

*Attesting Officer*

NICHOLAS P. GODICI
*Acting Director of the United States Patent and Trademark Office*